Aug. 29, 1933.                A. PETELER                1,924,373
                  SHOCK ABSORBER AND VALVE THEREFOR
                     Filed Dec. 16, 1930          2 Sheets-Sheet 1
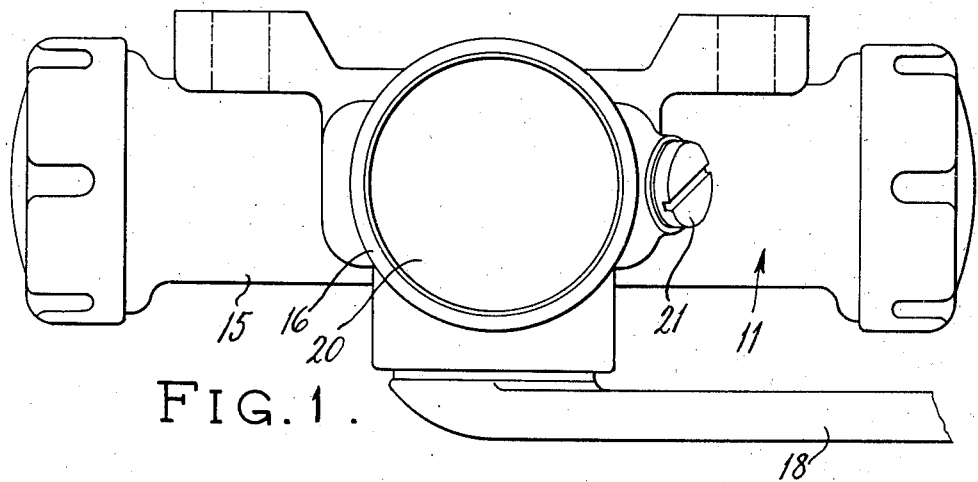
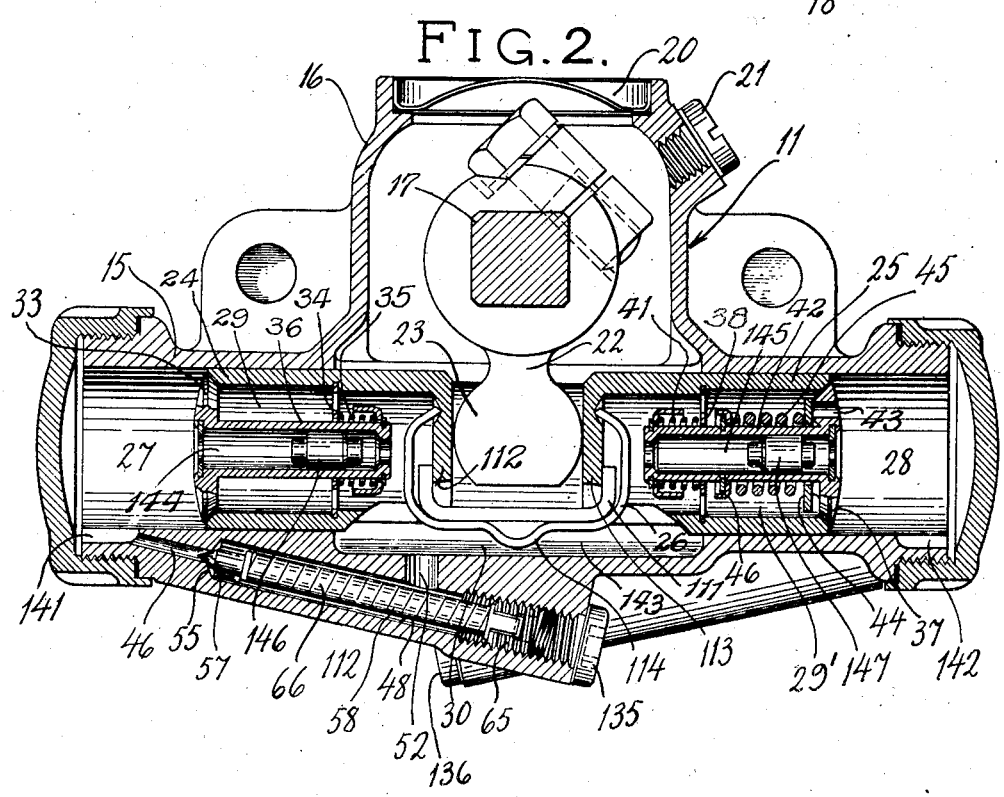
INVENTOR.
ADOLPH PETELER
BY
ATTORNEY.

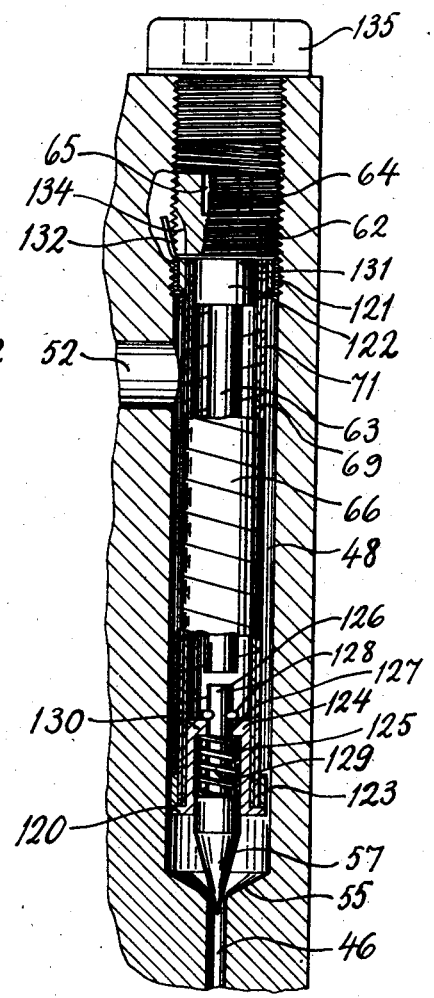

Patented Aug. 29, 1933

1,924,373

UNITED STATES PATENT OFFICE 1,924,373

SHOCK ABSORBER AND VALVE THEREFOR

Adolph Peteler, Freeport, N. Y.

Application December 16, 1930
Serial No. 502,642

4 Claims. (Cl. 236—93)

My invention relates to hydraulic shock absorbers and to improved thermostats suitable for use therewith. Specifically, it comprises an improvement upon the inventions disclosed in my prior applications, Serial Numbers 338,069 and 399,992.

The shock absorber disclosed in this application is similar to the shock absorber disclosed in my prior application, Serial Number 399,992, but differs therefrom in several respects. (1) Improved means are provided for connecting the two pistons which move back and forth within the cylinder of the shock absorber. (2) In lieu of the air chambers provided in the device of my former application for the purpose of cushioning the initial movements of the plungers I provide a pair of small concentric cylinders one in each plunger and each fitted with a small auxiliary plunger which are adapted to accomplish a similar purpose. (3) I reverse the direction of the thermostatic needle valve so that the needle points in the direction of flow of the fluid. (4) I replace the crossed intersecting bores by a more economical arrangement which includes a short bore substantially perpendicular to the longitudinal axis of the shock absorber. (5) I provide an improved lock which prevents the thermostatic needle valve from turning and thus becoming out of adjustment. (6) I provide a resilient tip for the needle valve. (7) I provide a guide in the thermostatic coil at the end adjacent to the point of the needle valve as well as one extending into the opposite end of the thermostatic coil. These coact with the resilient tip to prevent breakage of the thermostat. (8) Improved means of clamping the thermostat to the needle and the nut are also provided. (9) I provide improved means for preventing the rotation of the plungers.

One of the objects of the invention disclosed herein is to provide a novel shock absorber of improved design.

A further object of the invention is to provide an improved thermostat of the type disclosed in my prior application.

A more specific object of the invention is to provide a thermostat of the type of my prior application having means adapted to protect the thermostat against excessive pressures.

A further specific object is to provide improved means for locking the thermostatic needle valve against getting out of adjustment.

A further object is to provide improved means for holding the two plungers used in assembled relationship and for preventing accidental rotation of the plungers.

Further objects will be apparent from a reading of the subjoined specification and claims and from a consideration of the attached drawings.

In order to explain the invention more clearly, one embodiment thereof is shown in said drawings, in which:

Fig. 1 is a plan view of one form of shock absorber constructed according to my invention;

Fig. 2 is a view in vertical section of the shock absorber shown in Fig. 1 and showing details of said shock absorber;

Fig. 3 is an enlarged sectional detail of a thermostat constructed according to my invention and such as is used in the shock absorber shown in Figs. 1 and 2; and Fig. 4 is a view in perspective designed to show the details of my improved lock washer for preventing accidental disturbance of the adjustment of the needle valve.

The drawings show one form of vehicle shock absorber illustrative of my invention. Referring particularly thereto and especially to Fig. 1, the shock absorber may be seen to comprise a casing generally designated 11 which may be attached by any suitable means such as by bolts to any convenient part of the chassis of the vehicle. The casing may include a lower cylinder 15 and an upper dome portion 16. Extending transversely through the dome portion 16 is a shaft 17 (See Fig. 2) which carries pivoted at its upper end (See Fig. 1) a movable lever arm 18. The outer end of the arm 18 may be fastened by any suitable means to an axle of the vehicle. It may thus be seen that movement of the axle relative to the chassis causes a turning movement of the shaft 17 within the casing 11. The dome portion 16 may be if desired provided with a spring cover 20 and a filling plug 21.

I provide hydraulic resistance to rotation of the shaft 17 in order that the relative movement of the axle and the chassis of the vehicle may be cushioned. As shown in Fig. 2 the shaft 17 carries within the casing 11 a lever 22 having a lower thrust cam member 23 positioned within the cylinder 15 of the casing 11. Also positioned within the cylinder 15 are a pair of liquid tight pistons generally designated 24 and 25, placed one on each side of the thrust member 23 and continuously maintained in contact therewith by a rigid connecting member 111 and by a spring 26. The main purpose of the spring 26 is to prevent play between the thrust member 23 and the pistons 24 and 25. It accomplishes this purpose regardless of wear of the thrust member 23, the pistons 24 and 25, and the rigid member 111. Moreover, the spring 26 acts to keep the pistons from rotating relative to each other and to maintain the connection by means of the rigid member 111. The spring 26 fits tightly against the rigid member 111 and maintains it in such position that it overlaps and bears against extensions 112 and 113 of the pistons 24 and 25, respectively. The rigid member 111 prevents excessive bending or breaking of the spring in case of overloads. The spring 26 is substantially C-shaped but has a bulge 114 on its lower side for purposes later to be described. As may thus be seen turning movement of the shaft 17 causes movement of both pistons 24 and 25 within the cylinder 15. The casing 11 is adapted to be partially or wholly filled with a suitable liquid such as oil which will resist movement of the pistons 24 and 25 and thus resist relative movement of the axle of the chassis.

The ends of the cylinder 15 beyond the pistons as shown in the drawings are designated 27 and 28. Means are provided for allowing the controlled flow of liquid between the ends 27 and 28 and thus for allowing cushioned movement of the pistons 24 and 25 in the casing 11 and consequently cushioned movement of the chassis of the vehicle relative to the axle thereof. The pistons 24 and 25 are hollow as at 29 and 29' and the hollow portions are freely interconnected through the central reservoir 30. A check valve 33 for the piston 24 mounted in a spider 34 and normally held on its seat by a spring 35 fastened to the inner end of the tubular valve stem 36, allows free movement of the oil from the central reservoir 30 into the end 27. However, it prevents the direct return of the oil from the end 27 to said central reservoir.

Similarly, a check valve 37 for the piston 25 mounted in a spider 38 and normally held on its seat by a spring 41 fastened to the inner end of the tubular valve stem 42, allows free movement of the oil from the central reservoir 30 to the end 28. However, it normally prevents the direct return of the oil from the end 28 to the central hollow reservoir 30.

The valve 37 is provided with a safety relief means in order to guard against breakage of parts by reason of any excessively heavy and sudden shocks being transmitted to or by the arm 18. This safety relief means comprises a plurality of holes such as 43 formed in the valve 37, a plate 44 positioned inside of the valve around the tubular stem 42 and normally held to cover the holes 43 by a relatively strong spring 45 bearing on a flange 46 on the tubular stem 42. When any excessive force is transmitted to move the piston 25 toward the right as shown in Fig. 2, the plate 44 may lift and allow the escape of oil past it.

Restricted passages are provided by which oil may pass from the ends 27 and 28 to the central reservoir 30 but because of the small size of the passages and because of needle valves interposed in the passages, it may not pass freely as it does when passing from said central reservoir outward. The lower enlarged wall of the cylinder 15 has a restricted bore 46 leading from the end 27 downward at an angle. It has a similar bore leading from the end 28 downward at a similar though opposite angle. Aligned with and continuing in the same general direction as the bore 46 is an enlarged bore 48 which is designed for the reception of one of my improved thermostatic needle valves and the restricted bore leading from the passage 28 has a similar enlarged and aligned bore continuing therefrom and adapted to receive a similar needle valve. The bore 48 has connected therewith a substantially vertical bore 52 which leads upward to the central reservoir 30 and the enlarged bore on the right-hand side of the shock absorber has a similar vertical bore (not shown) also leading upward to the central reservoir 30. It is thus clear that oil may be forced from the end 27 through the bore 46 into the bore 48 and thence through the bore 52, the reservoir 30 and the valve 37 into the end 28. Likewise, oil may be forced from the end 28 through the corresponding bores on the right-hand side of the shock absorber into the central reservoir 30 and through the valve 33 into the end 27.

I provide additional devices for regulatively retarding the passage of oil through the passages described in the last paragraph, such devices including means for manually adjusting the amount of the retardation and means for automatically adjusting such retardation dependent upon temperature variations. Similar devices are provided on both sides, one in the bore leading to the end 27 and the other in the bore leading to the end 28. The devices are exactly the same and a description of one will suffice for both. The upper end of the bore 48 is formed with a conical seat 55, and a thermostatically controlled needle 57 is arranged within said bore, the size of the bore, the thermostat, and needle being so proportioned that a space is provided between them for the passage of oil. The needle is arranged to be moved toward and away from the seats 55, in order to regulatively constrict the size of the passage between the bore 48 and the bore 46. As clearly shown in Fig. 3 the needle 57 is carried on the inner end of one of my improved coiled strip thermostats 66. The outer end of the thermostat is fastened to the adjusting screw 62 by means of a ring 121 which surrounds the outer end of the thermostat, said outer end in turn surrounding a reduced extension 122 of the screw 62 and in effect abutting the enlarged portion or end thereof. The ring 121 is crimped on to the end of the thermostat and thus presses it tightly against the extension 122 and fastens the thermostat thereto.

The inner end of the thermostat is fastened to the needle 57 by means of a similar ring 123 which surrounds the inner end of the thermostat. Said inner end of the thermostat in turn surrounds a flanged sleeve 124 and abuts against a flange 120 on the inner end of said sleeve. The sleeve has a pocket or opening 125 into which the needle 57 and its stem 126 is adapted to slide. The sleeve 124 is provided with a second flange 130. Through the flange 130 there extends an opening 127 of smaller diameter through which the outer end of the stem 126 extends. After the stem 126 has been inserted through the opening 127 it is crimped or burred as at 128 so as to prevent the needle from being wholly withdrawn from the sleeve 124. Inserted in the pocket 125 and surrounding the stem 126 is a compression spring 129 by which the needle is normally maintained extending outward the fullest possible distance from the thermostat. The stem 126 not only serves to resiliently connect the needle 57 to the inner end of the coiled strip but also extends part of the way through said strip to serve as a guide. As is described later it aids in protecting the coiled strip against excessive pressures.

The thermostat 61 thus normally forms the sole connection between the adjusting screw 62 and the needle 57. The adjusting screw has formed integrally therewith extending inward from the extension 122 a rod 63 which forms a guide for the thermostat 61 to prevent the coils thereof from buckling or lapping. Moreover, when the spring 129 is compressed by excess pressures the stem or rod 126 contacts with the rod 63 and forms a solid connection between the ends of the thermostat thus protecting the thermostat. The adjusting screw 62 is externally screw-threaded and is screwed into the internal screw threads 64 of the bore 51. The adjusting screw 62 also has formed in the head thereof a hexagonal socket 65 for the insertion of a suitable tool to be used in the manual adjustment thereof.

Surrounding the extension 122 and intermediate the ring 121 and the head of the screw 62 is a resilient locking ring or washer shown more clearly in Fig. 4. The ring is generally designated 131 and is formed with resilient normally outwardly extending projections 132 and 133 and the head 120 of the adjusting screw 62 is formed with a pair of notches one of which is shown at 134. When the screw is being threaded into the bore 51 the projections 132 and 133 are compressed into the notches and allow the rotation of the screw. However, when the screw is adjusted, the projections 132 and 133 spring out into contact with the threads 64 of the bore and prevent the accidental unscrewing and thus prevent the needle valve from getting out of adjustment. Bolts 135 and 136 may be provided at the outer end of the bore 48 and the corresponding bore on the right for the prevention of the escape of fluid therefrom in order to prevent accidental adjustment of the adjusting screws and to prevent the egress of oil and the ingress of dirt.

My improved thermostat comprises a coil formed from a continuous unitary strip of two layers of metals of different coefficients of expansion. It is important that the strip shall be so formed that at all normal temperatures it will coil and so formed that adjacent turns of the coil will contact firmly with each other without overlapping and after being pulled apart and released will spring back into contact. In the preferred embodiment illustrated, I have shown a metal of low coefficient of expansion which may be invar, positioned inside of the coil as at 69 and a metal of high coefficient of expansion which may be brass positioned outside of the coil as at 71. The connections between the needle valves and their adjusting screws is thus rigid and solid at all times and is capable of withstanding the force of all normal shocks which may be imposed upon them by the irregularities of the road. However, in order to prevent the breakage of the thermostat due to the imposition of abnormal loads thereon I provide the improved structure which includes the means described for connecting the needle 57 to the inner end of the thermostat 66. Thereby, if an abnormal load is imposed upon the needle 57 it springs back compressing the spring 129 until the end of the stem 126 comes into contact with the rod 63. Thus, the thermostat 61 is not called upon to bear any loads in excess of the strength of the spring 129 and is thus protected from breakage at all times.

Moreover, the structure described in the last paragraph protects the thermostat against the excessive application of manual force thereto which might injure the thermostat if it is screwed too far into the bore. At the same time the structure provides a means for determining the adjustment of the needle with regard to the seat. Thus the thermostat may be screwed in by the application of a wrench to the socket 65 of the screw 62 until the needle 57 contacts with the seat 55 and the rod 63 contacts with the stem 126. Thereafter, the assembly may be backed off a certain number of turns in order to provide an accurate adjustment of the needle relative to the seat. This function is important inasmuch as it is impossible otherwise to determine the exact position of the needle relative to the seat.

The cylinder 15 is formed with end wells 141 and 142 into which the groove 46 and the corresponding groove on the right lead. It is also formed with a central well or groove 143 into which the projection or bulge 114 of the spring 26 extends when the shock absorber is in its normal assembled condition. By the positioning of the extension 114 in the well or groove 143 the plungers 24 and 25 are prevented from rotating far about their longitudinal axes.

Provision is made to cushion the beginning of the stroke of the pistons 24 and 25 in order to prevent slapping and the consequent noise. As stated previously, the valve stems 36 and 42 are tubular, having central hollow portions 144 and 145, respectively. The openings leading from the chamber 27 and the central reservoir 30 to the hollow portion 144 are reduced in size and in like manner the openings leading from the central reservoir 30 and the chamber 28 to the hollow portion 145 are also reduced. Included within the hollow portion 144 is a sliding plunger 146 formed with reduced ends. Included in the hollow portion 145 is a similar plunger 147. As the plungers 146 and 147 approach the ends of the tubular members 36 and 42 small quantities of oil are partially trapped between the ends of the hollow tubular members and the enlarged portions of the plungers and thus prevent noise and shock which might otherwise be occasioned.

By means of my improved thermostat changes of temperature will accurately vary the size of the passages between the bore 48 and the bore 46 and between the corresponding bores on the right side of the cylinder to compensate for changes in viscosity of the oil also due to temperature changes. As the temperature increases the outer metal will expand much faster than the inner metal and will consequently bend the strip inward causing the coil to be reduced in diameter and to be coiled more tightly. This causes a powerful screw action upon the needles which forces them toward their seats. There will also be a slight movement of the needles toward their seats caused directly by the longitudinal expansion of the metal in the coil due to the heat but this movement will be infinitesimal as compared to the movement of the needles caused by the screw action incident upon the increased bending of the metal, the tighter winding of the coil, the decrease in diameter thereof and the consequent increase in the number of turns of equal width in the coil. When the temperature decreases there is an increase in diameter of the coil and a consequent shortening thereof. Thus, I have devised a thermostat which will control the size of the oil passages to compensate for changes in viscosity of the oil and which is positive in its action, is capable of withstanding great pressures and may be confined in a relatively small space compared to the variations in length thereof caused by changes in temperature.

In the operation of the shock absorber used for illustration of my invention, movement of the axle of the vehicle relative to the chassis, causes a pivotal movement of the shaft 17 and a consequent movement of the thrust member 23 in one direction or the other. This movement causes a coincident movement of the pistons 24 and 25 in the same direction. Assuming that the movement is to the left, liquid is forced from the end 27 through the proper constricted passages catalogued above past the needle 57 and finally into the end 28. If the movement is to the right, oil is forced through the right-hand constricted passages, past the right-hand needle valve into the central reservoir and thence into the end 27. The size of the passages and especially the size of the passages past the needle valves causes a yielding resistance to be imparted to the movement of the liquid and to relative movement of the axle and chassis. This yielding resistance gives the desired easy riding qualities.

If the temperature increases, the oil becomes less viscous and would be expected to impart less resistance. However, the temperature increase also causes a greater bending of the thermostatic strips, a tightening of the coils, a consequent lengthening thereof and thus the needles are moved closer to their seats and the passages made more restricted to compensate for the decreased viscosity of the oil. As the temperature drops, the thermostats similarly withdraw the needle valves to compensate for the increased viscosity of the oil. If desired at any time, either of the needle valves may be manually adjusted to increase or decrease resistance of the oil at any selected temperature. While I have described the shock absorber as designed for the use of oil, I may, if desired, use any other suitable fluid.

Should high pressures be developed due to any cause it will not cause a breakage of the thermostat. For instance, suppose a high pressure were developed in the passage 46, the pressure would cause the needle 57 to move toward the right as shown in Fig. 4 until the stem 126 contacts with the rod 63. The stem 126 and the rod 63 then form a rigid substantially continuous support which prevents the thermostat 48 from buckling.

In assembling my shock absorber, the pistons 24 and 25, the connection 111 and the spring 26 are assembled outside of the cylinder 15. Then before the lever 22 is inserted the assembled plungers are slid in through one of the ends of the cylinder. This insertion is upside down so that the ends of the spring contact with the normally upper walls of the piston. Thus, the bulge 114 does not protrude beyond the line of the normally lower walls of the pistons. After reaching the position shown in Fig. 2, the assembed pistons and connection are turned right side up and the bulge 114 falls down into the groove 143. Thereafter the lever 22 is inserted through the opening normally closed by the cap 20 and as the pistons are forced apart by the thrust member 23, the ends of the springs are forced into the notches formed in the extensions 112 and 113.

I have shown my improved thermostat as a part of a shock absorber but it is to be understood that it is also useful in many other combinations. For example it may be useful in controlling the air relief valves of steam radiators. It may also be useful in many other relations for the control of any fluid, air or gas.

It is to be understood that while I have described the thermostat as having the layer of metal of low coefficient of expansion on the inside and the layer of metal of high coefficient on the outside, yet the thermostat can be constructed with the layers reversed, in which case the length of the coil would be decreased as the temperature rises and would be increased as the temperature is lowered.

It is to be understood that the above described embodiment of the invention is for the purpose of illustration only and various changes may be made therein without departing from the spirit and scope of the invention.

I claim as my invention:

1. A thermostatic valve assembly for hydraulic shock absorbers including a coil thermostat, a member adapted to be fastened to the structure of the shock absorber, said member having formed thereon an extension over which one end of the coil thermostat is fitted, a valve seat, a member having formed thereon an extension over which the opposite end of the coil thermostat is fitted, said member being movable in its relation to said valve seat as said thermostat expands and contracts due to temperature changes, a valve carried by said last mentioned member and movable therewith in its relation to said valve seat, and means encircling the ends of the coil thermostat for fastening said ends to the extensions of the respective members.

2. A thermostatic valve assembly for hydraulic shock absorbers including a coil thermostat, an exteriorly threaded member adapted to be manually adjusted in its relation to the structure of the shock absorber and to which said coil thermostat is fastened, a valve seat, a valve carried by and movable with said coil thermostat in its relation to said valve seat, and means adapted to engage the structure of the shock absorber for locking said member and hence the thermostat in its manually adjusted position.

3. A thermostatic valve assembly for hydraulic shock absorbers including a coil thermostat, an exteriorly threaded member adapted to be manually adjusted in its relation to the structure of the shock absorber and to which said coil thermostat is fastened, a valve seat, a valve carried by and movable with said coil thermostat in its relation to said valve seat, and a lock washer carried by said member and by means of which said member and hence the thermostat is locked in its manually adjusted position.

4. A thermostatic valve assembly for hydraulic shock absorber including a coil thermostat, a member adapted for threaded engagement with the structure of the shock absorbers and by means of which the thermostat is manually adjusted in its relation thereto, said member having formed in its exterior wall a groove, a valve seat fixed in its relation to the structure of the shock absorber, a valve carried by and movable with said thermostat in its relation to said valve seat, and a resilient means fitting said groove and adapted to engage the threaded part of the shock absorber structure for locking said member and hence said thermostat in its manually adjusted position.

ADOLPH PETELER.